May 17, 1927.  
C. A. GOODSPEED  
1,628,660  
VEHICLE ANCHORAGE DEVICE  
Filed March 18, 1925
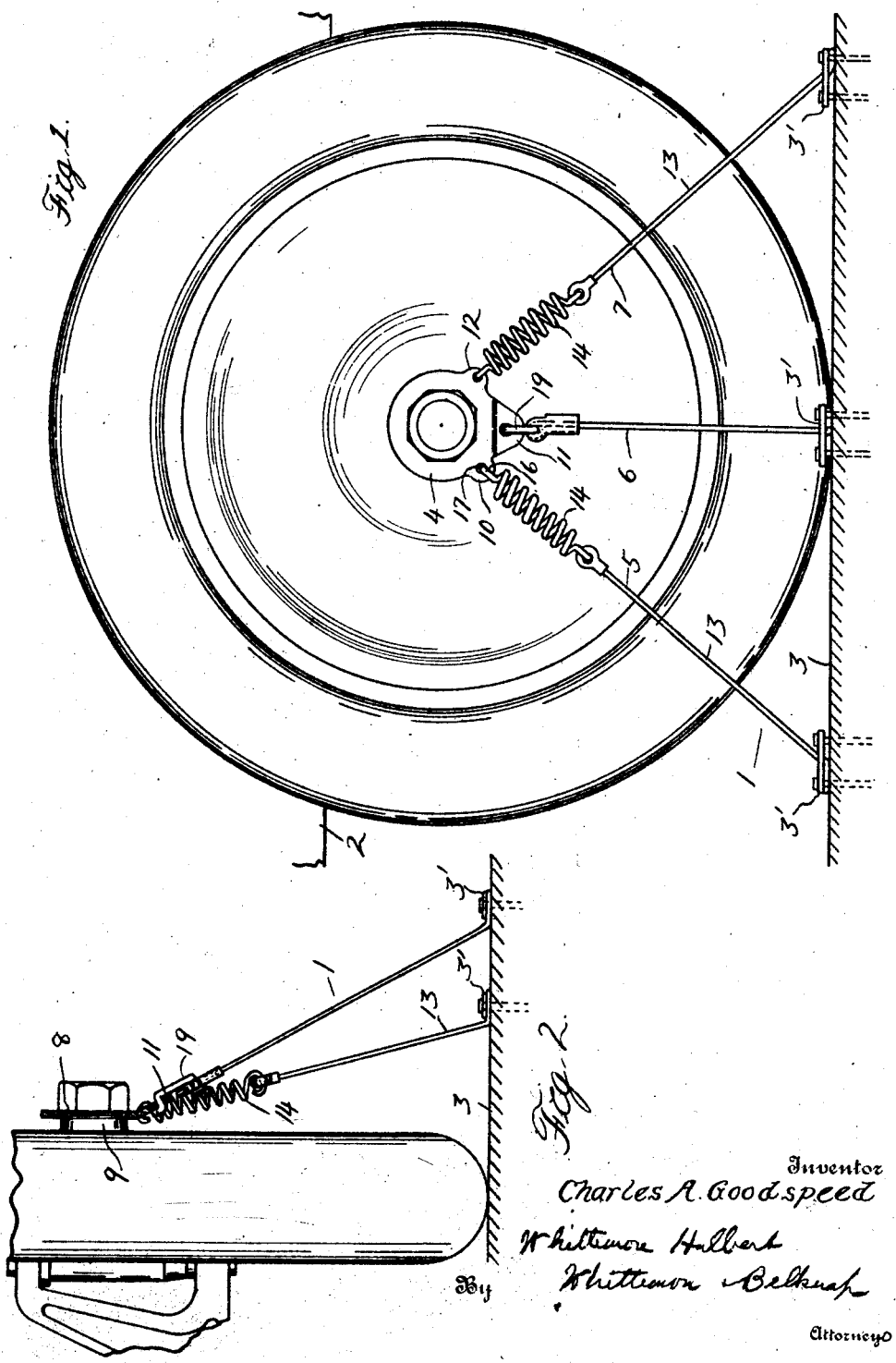
Inventor  
Charles A. Goodspeed  
By Whittemore Hulbert  
Whittemore Belknap  
Attorneys Patented May 17, 1927.

1,628,660

UNITED STATES PATENT OFFICE.

CHARLES A. GOODSPEED, OF DETROIT, MICHIGAN, ASSIGNOR TO WILLIAM W. BLAKELY, OF DEXTER, MICHIGAN.

VEHICLE ANCHORAGE DEVICE.

Application filed March 18, 1925. Serial No. 16,535.

This invention relates generally to devices for holding merchandise upon suitable supports and refers more particularly to devices that are used for holding vehicles and the like within freight cars or other suitable carriers.

One of the essential objects of the invention is to provide a simple and reliable device of this type that may be conveniently applied to a portion of the vehicle that is not painted or otherwise finished so that the use of protecting pads and the like may be obviated entirely.

A further object is to provide a strong and durable device which is simple in construction and can be manufactured at a comparatively low cost.

With the above and other objects in view the invention consists in certain novel features of construction, combinations and arrangements of parts as will be more fully described and particularly pointed out in the appended claims.

In the accompanying drawing;

Figure 1 is a fragmentary side elevation of a motor vehicle with an anchorage device embodying my invention applied thereto.

Figure 2 is a front elevation of the construction shown in Figure 1.

Referring now to the drawing in which like characters of reference designate corresponding parts throughout the several views, the numeral 1 designates an anchorage device embodying my invention for holding merchandise such as a motor vehicle 2 upon a suitable support such as the floor 3 of a freight car while in transit.

In order that the vehicle 2 will be held properly in the freight car, an anchorage device of this type is preferably located opposite to each wheel of the vehicle and comprises suitable floor plates 3', an adapter plate 4, and the intermediate tie members 5, 6 and 7 respectively. The floor plates 3' and adapter plate 4 may be any form desired.

In order that the anchorage device may be easily and quickly applied to or removed from the vehicle, the adapter plate 4 is preferably threaded as shown at 8 and is adapted to be screwed to the exteriorly threaded hub cap 9 of the vehicle. This adapter plate 4 is also preferably provided with three depending lugs 10, 11 and 12 respectively to which the tie members 5, 6, and 7 respectively are preferably secured. As shown, each tie member 5 and 7 respectively preferably consists of a rod 13 and a coil spring 14. These rods may be secured at their lower ends by any suitable means to the floor plates 3' and may be secured at their upper ends by any suitable means to the lower ends of the springs 14, while the latter are preferably provided at their upper ends with suitable hooked portions 16 that engage suitable openings 17 in the depending lugs 10 and 12 respectively.

As shown, the intermediate tie member 6 preferably consists of a rod that is secured at its lower end to the floor plate 3' and is loosely connected by a link 19 at its upper end to the centre lug 11 of the adapter plate 4.

In use, the tie members 5 and 7 respectively will permit the vehicle to move a limited amount responsive to shocks and jars received in transit, while the tie members 6 will prevent any lateral movement of the vehicle. However, the arrangement is such that this limited movement will be effectively cushioned by the springs 14, consequently the vehicle is not likely to become damaged in transit. Moreover, the parts are simple in construction and can be quickly assembled. Due to this simplicity of construction and arrangement of parts, the cost of manufacturing and assembling such devices has been reduced to a minimum.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim as my invention is:

1. In an anchorage device of the class described, the combination with an anchorage member and an adapter member, of a tie member including a non-stretchable element an a stretchable element arranged end to end between said members.

2. In an anchorage device of the class described, the combination with an anchorage member and an adapter member, of a tie member including a rod and a longitudinally yieldable member arranged end to end between said members.

3. In an anchorage device of the class described, the combination with an anchorage member and an adapter member, of an intermediate tie member including a rod terminally secured to the anchorage member, and a spring terminally secured to the rod and adapter member.

4. The combination with a vehicle and a support therefor, of means for holding the vehicle on the support while permitting a limited movement of the vehicle, including a plate secured to the support, an adapter plate secured to the vehicle, and a tie member including a non-stretchable element secured to the first plate, and a yieldable element secured to said non-stretchable element and said adapter plate.

5. The combination with a vehicle, and a support therefor, of means for holding the vehicle on the support while permitting a limited movement of the vehicle, including a plate secured to the support, an adapter plate secured to the vehicle, and a tie member including a rod secured to the floor plate, and a link connecting the rod to the adapter plate.

6. In an anchorage device of the class described, the combination with an anchorage member, and an adapter member, of an intermediate tie member including a non-stretchable element secured to one of said members, and a spring terminally secured to the non-stretchable element and to the other of said members.

In testimony whereof I affix my signature.

CHARLES A. GOODSPEED.